(12) United States Patent
Nascetti et al.

(10) Patent No.: US 6,901,134 B2
(45) Date of Patent: May 31, 2005

(54) ARRANGEMENT COMPRISING ELECTRICAL ELEMENTS

(75) Inventors: Augusto Nascetti, Aachen (DE); Michael Overdick, Langerwehe (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 348 days.

(21) Appl. No.: 10/295,423

(22) Filed: Nov. 15, 2002

(65) Prior Publication Data

US 2003/0095628 A1 May 22, 2003

(30) Foreign Application Priority Data

Nov. 17, 2001 (DE) ......................................... 101 56 627

(51) Int. Cl.⁷ .............................................. H05G 1/64
(52) U.S. Cl. ..................................... 378/98.8; 348/310
(58) Field of Search ............ 378/98.8, 62; 250/370.08, 250/379.09, 208.1, 208.2; 348/302, 307, 308, 310; 362/12, 251

(56) References Cited

U.S. PATENT DOCUMENTS

| | | | |
|---|---|---|---|
| 5,953,061 A | * | 9/1999 | Biegelsen et al. .......... 348/308 |
| 6,734,908 B1 | * | 5/2004 | Watanabe et al. ........... 348/308 |
| 6,741,283 B1 | * | 5/2004 | Merrill et al. .............. 348/308 |
| 2003/0095629 A1 | * | 5/2003 | Nascetti et al. ............ 378/98.8 |

FOREIGN PATENT DOCUMENTS

DE 38 04 200 A1 8/1989

* cited by examiner

Primary Examiner—David V. Bruce
Assistant Examiner—Elizabeth Keaney

(57) ABSTRACT

The invention relates to an arrangement which comprises electrical elements which include sensors for electromagnetic radiation such as light or X-rays or are constructed so as to emit or change light. At least one element of the arrangement is provided with a switching unit which evaluates the signal patterns of at least two control inputs of the element and compares them with at least one activation pattern. The element is activated in the case of correspondence. At least two elements of the arrangement have at least one identical activation pattern. The control inputs of the elements are preferably coupled to a control lead bus.

24 Claims, 5 Drawing Sheets

ARRANGEMENT COMPRISING ELECTRICAL ELEMENTS

BACKGROUND

The invention relates to an arrangement which comprises electrical elements which may be sensors or light-emitting units. Arrangements of this kind are used, for example, in image acquisition systems such as X-ray examination systems or optical systems (cameras, photographic equipment) as well as in imaging systems (monitors, projectors).

In conventional two-dimensional arrangements of electrical elements, for example, sensors, the individual sensors are arranged in a matrix of rows and columns. The outputs of all sensor elements of a column are connected to a respective column read-out lead. After prior excitation of the sensors, the sensor elements of a row are simultaneously activated and all rows are sequentially activated in order to read out the arrangement. This read-out concept can also be applied to sub-zones of such an arrangement in further embodiments. For example, not all sensors of a column are connected to a common output lead, but the outputs of the sensors of each time the upper half and the lower half of a column are connected to a common read-out lead. As a result, two rows can be simultaneously activated, that is, each time one row from the upper half of the matrix and one from the lower half of the matrix.

The large number of line drivers for the control leads constitutes a drawback of such an arrangement. For example, a medium-sized sensor matrix with, for example, 1024 rows and 1024 columns, requires 1024 line drivers.

A one-dimensional photoelectric line sensor is known from Offenlegungsschrift DE3804200A1; the sensors therein are arranged in a line and generate a respective signal which can be applied to a read-out line, used in common by all sensors, by applying a control signal to the relevant sensor control input. With each sensor there is associated a binary decoder which is arranged to evaluate the signals of a digital address bus and to activate the relevant sensor when a specific signal combination is present on the bus.

SUMMARY OF THE INVENTION

It is an object of the invention to reduce the number of line drivers in an arrangement of electrical elements and to improve the drive concept for the activation of the electrical elements in respect of flexibility.

This object is achieved in one embodiment by means of an arrangement of sensor elements in which each sensor element includes at least one sensor and at least one output and can be activated in such a manner that in the activated state a sensor is coupled to at least one output and a signal generated by the sensor is present on the output, in which all sensor elements have at least one control input and at least two sensor elements have two or more control inputs and the control inputs are arranged to receive control signals whose combination forms signal patterns on the control inputs, in which each of the sensor elements includes at least one switching unit which is coupled to the sensor, to the output and to the control inputs and is arranged so as to evaluate the signal patterns present on the control inputs in order to compare these patterns with at least one activation pattern and to activate the relevant sensor element in the case of correspondence between the signal pattern present and an activation pattern, and in which at least two sensor elements have at least one identical activation pattern.

The arrangement in accordance with the invention is characterized in that it includes sensor elements which have at least one sensor and at least one output. The sensor is arranged, for example, to detect electromagnetic radiation such as light or X-rays and to generate a signal which is dependent on the intensity of the detected radiation. An arrangement of this kind may thus form an X-ray image detector and/or an optical image detector and be used, for example, in an X-ray examination system or an image-forming system such as a camera. Generally speaking, the signal arising in the sensor during a detection phase should be applied to a signal processing unit (not elaborated herein) via one of the outputs. In order to ensure that such a signal can reach the output or outputs only at selected instants, that is, in a controlled fashion, the sensor elements are arranged to be activatable; this means that in the activated state a sensor is coupled to at least one of the outputs. In order to achieve this, the sensor elements also include at least one control input and at least one switching unit. A switching unit of this kind is coupled to at least one of the sensors, to at least one output and to at least one control input. The switching unit is arranged to compare signal patterns, formed by control signals present on the control inputs, with one or more activation patterns. When an activation pattern is present on the control inputs, the switching unit couples the sensor to the output or outputs. A signal pattern present on the control inputs thus forms an activation pattern when it leads to activation of the sensor element, thus enabling further transport of a sensor signal. The activation pattern or patterns are stored in the switching unit at the instant of comparison. Furthermore, in the arrangement in accordance with the invention at least two sensor elements form a group such that all sensor elements of a group have at least one identical activation pattern. To this end, at least two sensor elements comprise at least two control inputs. When a common activation pattern is simultaneously present on all sensor elements of a group, all sensor elements of this group are simultaneously activated and the signals present on the corresponding outputs and generated by the sensor can be further processed in parallel.

As the number of control inputs per sensor element is higher, the complexity of the activation pattern increases and vice versa. When the control inputs of a plurality of sensor elements are coupled to one another via control leads, many sensor elements can be activated individually or in groups by means of only a few control leads. Overall these characteristics enable the flexibility of the activation of the individual sensor elements, and hence the flexibility of the read-out process of the entire arrangement, to be adapted to the relevant application or to be adapted even dynamically during operation. When an arrangement in accordance with the invention is used in digital systems, the control inputs are advantageously arranged to receive digital signals. Such signals may be supplied, for example, by other components which are already included in such systems and can be used directly, that is, without conversion, for controlling the control inputs.

Another advantageous embodiment is characterized in that the arrangement in accordance with the invention includes at least one control lead bus whereto all control inputs of all sensor elements are coupled. A control lead bus consists of a plurality of control leads which are usually driven in parallel, meaning that they conduct control signals simultaneously. The control lead bus serves to distribute control signals which usually originate from outside the arrangement between the individual sensor elements. To this end, preferably a single control lead is connected to a control input of at least one, but usually several or even all sensor elements. It is also possible to connect the same control bus leads to the control inputs of several sensor elements. The total number of leads of the control lead bus is at least equal to the number of control inputs of the sensor element having the largest number of control inputs. Every lead of the control lead bus is typically coupled to a line driver which, in dependence on the technology used, is integrated in the arrangement or is situated outside the arrangement.

In conformity with another embodiment the number of control inputs is advantageously the same for all sensor elements. The complexity of the signal patterns and activation patterns can thus be the same for all sensor elements, resulting in a uniform configuration of all signal patterns and activation patterns transported via the control lead bus. Because of the uniform configuration, the generating of signal patterns and activation patterns is also simplified.

The larger the number of control inputs of the sensor elements is chosen to be, the more complex the signal patterns present on the control inputs may be and the smaller the number of simultaneously controllable sensor elements can be. However, in the case of a large number of control inputs per sensor element, the number of connection leads between the control lead bus and control inputs increases and also the complexity of the switching unit. In conformity with given secondary conditions, for example, technologies used to realize the arrangement, the implementation of the arrangement can be adapted in respect of the number of control lead inputs per sensor element, the number of control bus leads and the complexity of the switching units.

In order to minimize the means required for generating the signal patterns on the one hand and to simplify the technical realization of the switching unit which analyzes the signal patterns and compares them with activation patterns on the other hand, in an advantageous further embodiment of the invention as disclosed in the claims 4 and 5 the switching unit is arranged to perform a logic AND operation on the signals present on the control inputs. When the two digital signals occurring on a control input are denoted by the references "0" and "1", performing an AND operation on the signals means that the switching unit activates the sensor element only if the signal "1" is present on all control inputs. Such an activation pattern can be simply generated in a digital system. Furthermore, the technical realization of the switching unit, consisting of a series of successively connected switches, can be simply converted by means of contemporary means. In the simplest case use is made of the same type of switches as used thus far for sensor elements provided with a switch.

When an arrangement in accordance with the invention is used in an image-forming system, it is advantageous that the sensor elements of an arrangement in accordance with the invention can be associated directly with a pixel. Because in a system of this kind the image processing as well as the image display is usually based on images whose pixels are arranged in a matrix of rows and columns, it is advantageous to elaborate the arrangement in accordance with another aspect of the invention.

When a plurality of sensor elements is to be simultaneously activated as a group in order to enable further processing in parallel of the output signals of the sensor elements, all sensor elements advantageously have an identical activation pattern and the individual groups are coupled to a control lead bus each time in a different manner. In order to activate the groups, the individual control leads of the control lead bus receive each time the same activation pattern in different combinations. An arrangement of this kind is described, by way of example, as an embodiment in the description of the Figures.

The embodiments mentioned above illustrating principles of the present invention may be included, for example, in an X-ray examination system, which system includes an X-ray image detector which is preferably manufactured by means of the thin-film technique, or be included in an optical image acquisition system.

The aforementioned object is achieved for a further embodiment of the invention by means of an arrangement of light-emitting and/or light-changing elements, in which each of said elements includes at least one light-emitting and/or light-changing unit and at least one input, the light-emitting elements being activatable in such a manner that in the activated state the light-emitting and/or light-changing unit is coupled to at least one input and the light-emitting and/or light-changing unit emits or changes light in dependence on the signal present on the input, in which all light-emitting elements have at least one control input and at least two light-emitting elements have two or more control inputs, the control inputs being arranged to receive control signals whose combination forms signal patterns on the control inputs, in which each of the light-emitting elements comprises at least one switching unit which is coupled to the light-emitting and/or light-changing unit, to the input, and to the control inputs and is arranged to evaluate the signal patterns present on the control inputs, to compare these signal patterns with at least one activation pattern and to activate the relevant light-emitting element in the case of correspondence between the signal pattern present and an activation pattern, and in which at least two light-emitting elements have at least one identical activation pattern.

The object is achieved in a corresponding manner as follows while utilizing light-emitting elements: a light-emitting element comprises first of all a light-emitting unit which constitutes the counterpart of the aforementioned sensor and is arranged to emit light. Such a light-emitting unit may be formed, for example, by a light-emitting diode. The intensity of the emitted light can then be adjusted on the basis of an intensity signal which usually originates from an external source and may be present on the input or inputs. The intensity signal is the counterpart of the signal generated by a sensor and the input constitutes the counterpart of an output. The intensity signal should reach the light-emitting unit only at selected instants, that is, when the light-emitting element is activated. To this end, the light-emitting element includes a switching unit as well as the associated control inputs, the switching unit and the control inputs performing the same function as in the case of a sensor element.

In the case of an arrangement comprising light-changing elements, the elements include a light-changing unit instead of a light-emitting unit, the light-changing unit being arranged to change transmitted and/or reflected light. The intensity signal then influences the degree of change of the light. A change of light may be, for example, the changing of the spectral composition of the light, of the intensity of the light or of the polarization of the light.

The various features of the invention and the above explanations can be applied in the same sense to an arrangement comprising light-emitting elements and light-changing elements. An arrangement may be included in an image display system, for example, a monitor.

The following description, claims and accompanying drawings set forth certain illustrative embodiments applying various principles of the present invention. It is to be appreciated that different embodiments applying principles of the invention may take form in various components, steps and arrangements of components and steps. These described embodiments being indicative of but a few of the various ways in which some or all of the principles of the invention may be employed in a method or apparatus. The drawings are only for the purpose of illustrating an embodiment of an apparatus and method applying principles of the present invention and are not to be construed as limiting the present invention.

BRIEF DESCRIPTION OF THE DRAWINGS

The foregoing and other features and advantages of the present invention will become apparent to those skilled in the art to which the present invention relates upon consideration of the following detailed description of apparatus applying aspects of the present invention with reference to the accompanying drawings, wherein.

DETAILED DESCRIPTION

The following embodiments relate to arrangements provided with sensor elements; towards the end of this description reference is made to arrangements with light-emitting elements.

Figure 1:
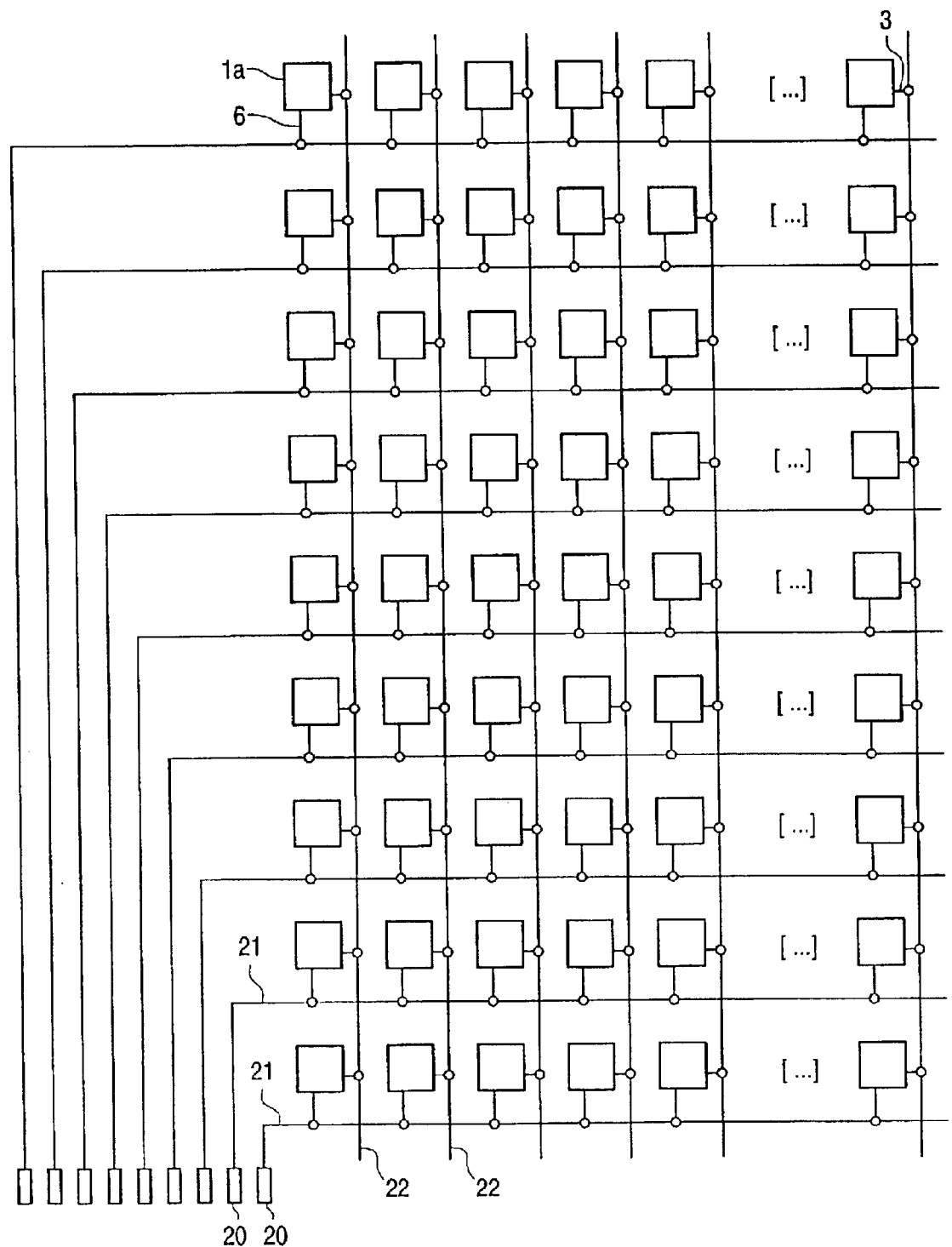
FIG. 1 shows an arrangement of sensor elements as known from the state of the art.

FIG. 1 shows an arrangement with sensor elements as it is known from the state of the art. The sensor elements 1*a* are arranged in a matrix of rows and columns. Each sensor element 1*a* has a control input 6 and an output 3. The control inputs 6 of all sensor elements 1*a* of a row are coupled to one another via a respective common control lead and are controlled by a line driver 20. The outputs 3 of all sensor elements of a column are coupled to one another. In order to read out the arrangement, all common control leads sequentially receive a control signal so that the output signals of all sensor elements 1*a* of a column can sequentially reach a unit for further processing.

Figure 2:
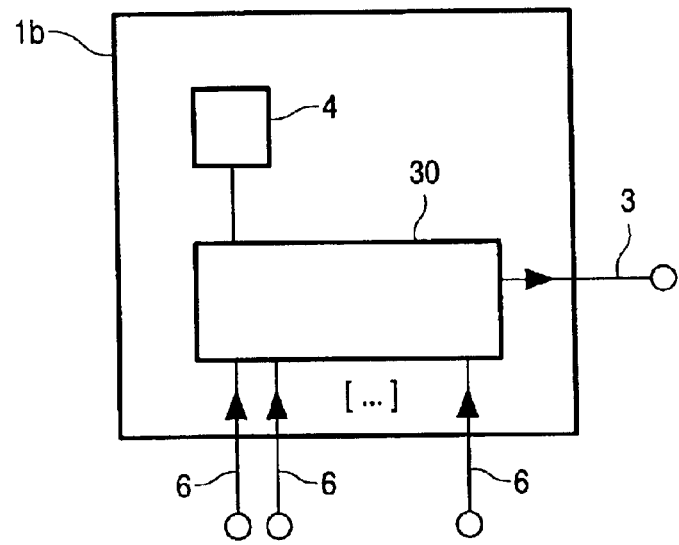
FIG. 2 shows a general sensor element.

FIG. 2 shows a sensor element 1*b* which includes a sensor 4, an output 3 and several control inputs 6. The sensor 4, the output 3 and the control inputs 6 are coupled to a switching unit 30 which is arranged to evaluate the signal patterns formed by the signals present on the control inputs 6 and to compare these signal patterns with activation patterns. When the signal pattern present corresponds to an activation pattern, the charge collected in the sensor 4 during a detection phase can be discharged via the output 3.

Figure 3:
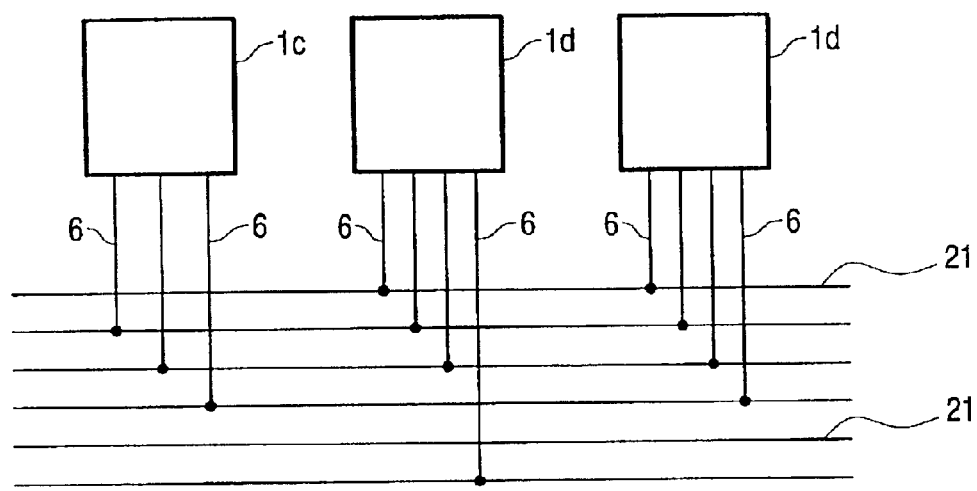
FIG. 3 shows a general arrangement with sensor elements.

FIG. 3 shows three of such sensor elements 1*c* and 1*d* as part of an arrangement in accordance with the invention. The control inputs 6 of the sensor elements 1*c* and 1*d* are connected to one another by common control leads 21, it not being necessary for all common control leads 21 to be coupled to each sensor element 1*c* or 1*d*. Furthermore, the sensor elements 1*c* and 1*d* may also have a respective, different number of control inputs 6.

Figure 4:
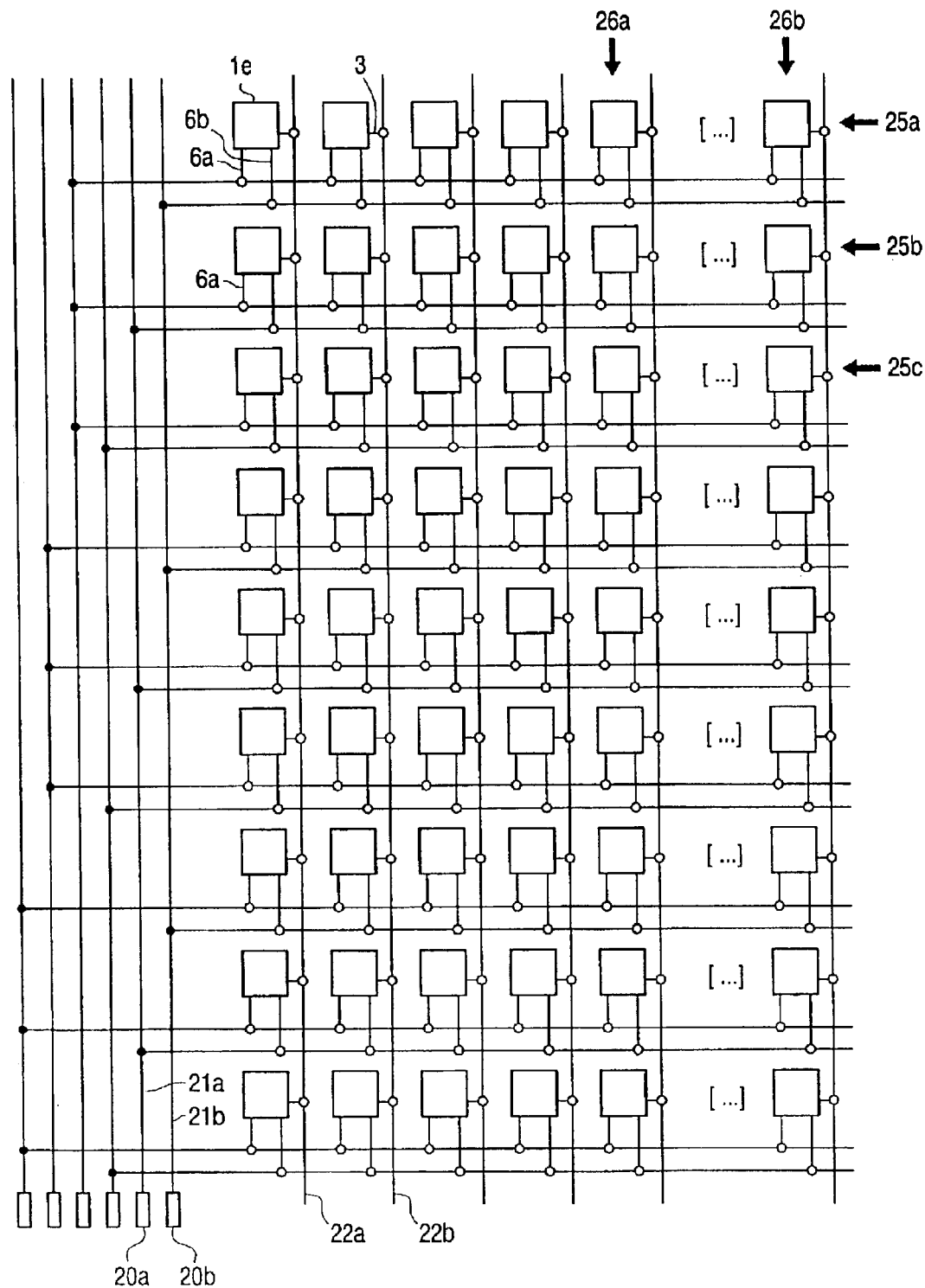
FIG. 4 shows a preferred arrangement of sensor elements.

FIG. 4 shows a further preferred embodiment of the invention which is characterized in that all sensor elements 1*e* have a first control input 6*a* and a second control input 6*b*, the control inputs 6*a* and 6*b* being arranged to receive digital signals which are denoted by the references "0" and "1". Exactly one activation pattern is associated with the switching unit 30 of each sensor element 1*e*. The signals present on the two control inputs 6*a* and 6*b* are subjected to a logic AND operation so that when the signal "1" is present on both control inputs 6*a* and 6*b* at a given instant, the sensor element 1*e* is activated and that the sensor element 1*e* is not activated in the presence of any other signal pattern. Such a sensor element 1*e* will be described in detail hereinafter. The sensor elements 1*e* are arranged in a matrix of horizontal rows, for example, 25*a*, 25*b* or 25*c*, and vertical columns, for example, 26*a* or 26*b*, the outputs 3 of all sensor elements 1*e* of a respective column being coupled to a common read-out lead, for example, 22*a* or 22*b*, and all first control inputs 6*a* as well as all second control inputs 6*b* of the sensor elements 1*e* in a row being connected to a respective control lead, for example, 21*a* or 21*b*, of a control lead bus. When two control leads of the control lead bus receive the signal "1" and all other control leads receive the signal "0", exactly one row is activated so that the charge signal generated during a preceding detection phase can be discharged from each sensor element 1*o* of this row, via the relevant read-out lead, so as to reach a unit (not shown) which further processes this charge signal. Furthermore, FIG. 4 also shows that each control lead of the control lead bus is controlled to a line driver, for example, 20*a* or 20*b*.

The known arrangement as shown in FIG. 1 requires a respective line driver 20 for each row, so nine drivers in this case. The arrangement in accordance with the invention as shown in FIG. 4, however, requires only six line drivers. When the number of rows is increased to an arbitrary number of N rows in the arrangement shown in FIG. 4, each sensor element having two control inputs, the number L of line drivers required will be $L=2 \cdot \sqrt{N}$ where L is rounded off to the next integer. For example, in an arrangement whose matrix of sensor elements consists of 1024 rows and 1024 columns, 1024 line drivers are required in the customary application (FIG. 1), whereas in an application in accordance with the invention as shown in FIG. 4 only 64 line drivers are required.

Figure 5:
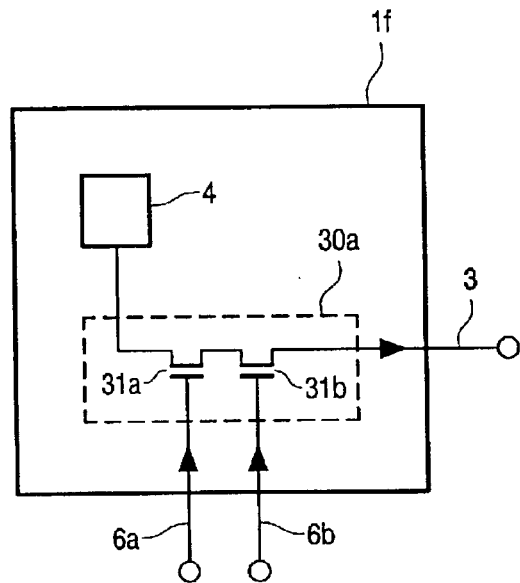
FIG. 5 shows a sensor element in conformity with the preferred arrangement.

FIG. 5 shows, by way of example, an embodiment of a sensor element 1*f* as disclosed in claim 6. The switching unit 30*a* of the sensor element 1*f* includes two series connected switches 31*a* and 31*b*, the switching inputs of the switches 31*a* and 31*b* forming the control inputs 6*a* and 6*b* of the sensor element 1*f*. The switches 31*a* and 31*b* are closed and hence the sensor element 1*f* is activated; when the signal "1" is present on both control inputs 6*a* and 6*b*. In that case a charge signal generated by the sensor 4 can reach, via the closed switches 31*a* and 31*b*, the output 3 so as to proceed to a signal processing unit (not shown). If only one or none of the two switches 6*a* and 6*b* is closed, the sensor element 1*f* is not activated.

Figures 6, 7:
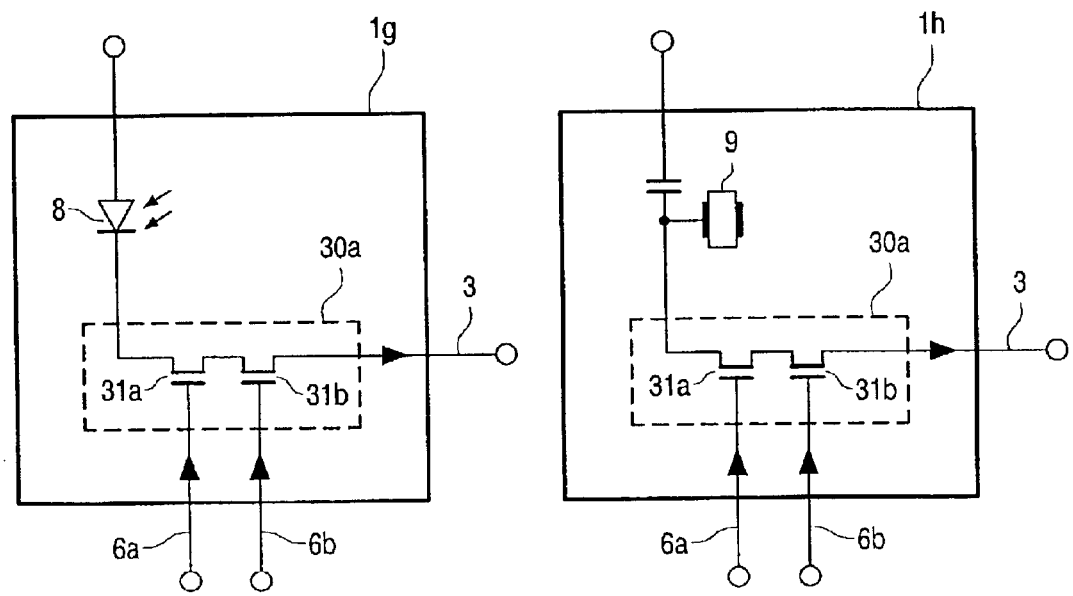
FIG. 6 shows a photosensitive sensor element.
FIG. 7 shows a directly converting, X-ray-sensitive sensor element.

FIG. 6 shows a further embodiment in which the sensor of the sensor element 1*g* is formed by a photodiode 8. Such a sensor is suitable for the detection of light. The detection of X-rays is also possible if, in addition to the photodiode, there is provided a scintillator (not shown) which is arranged to convert X-rays into light. The scintillator is arranged in such a manner that light emitted by the scintillator can be detected by the photodiode 8. However, FIG. 7 shows, by way of example, a directly converting sensor element 1*h* which can be used for the detection of X-rays. The sensor is then formed by a layer 9 between two electrodes, the layer material being arranged to conduct an electric current in response to the incidence of X-rays. The layer material may consist of, for example, amorphous selenium, lead iodide, lead oxide or mercury iodide.

Figure 8:
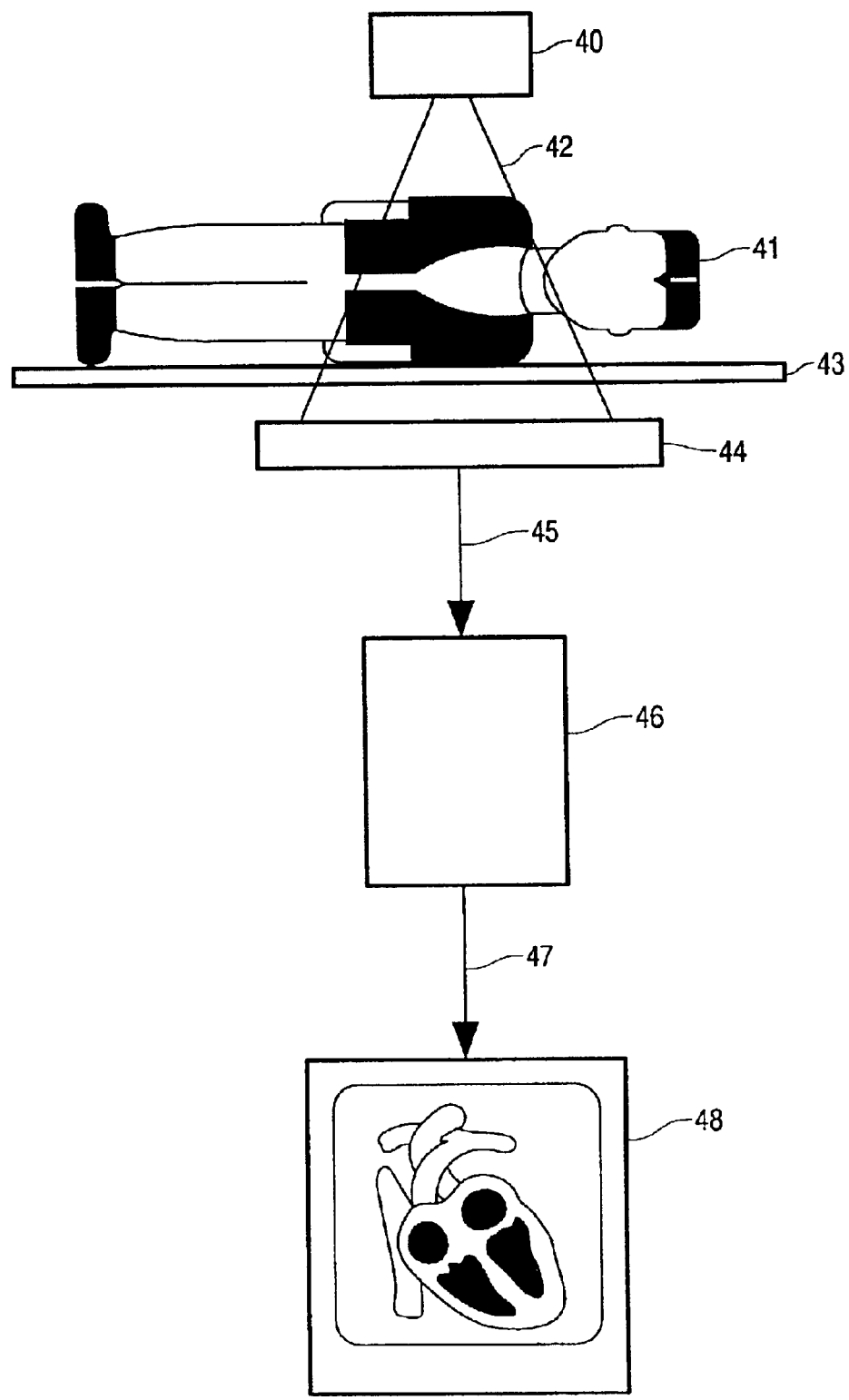
FIG. 8 shows an X-ray examination system provided with an arrangement in accordance with the invention.

A further preferred embodiment of the invention concerns the use of an arrangement of X-ray-sensitive sensor elements in accordance with the invention in an X-ray examination system. FIG. 8 shows a system of this kind, byway of example, in the form of a medical X-ray examination system. The system includes an X-ray source 40 which is arranged to emit X-rays 42 in such a manner that they traverse an object to be examined, in this case being a patient 41 positioned on a table 43 which is transparent to X-rays, and can be detected by an X-ray image detector 44 which is arranged underneath the table 43. The X-ray image detector 44 is provided with an arrangement of X-ray-sensitive sensor elements in accordance with the invention. Because of the organ-specific attenuation of the X-rays 42 during their passage through the patient 41, an image is formed in the X-ray image detector 44; the data 45 of this image is applied to a data processing unit 46. The data processing unit 46 is also capable of performing other system control tasks (not elaborated herein0 and processes the incoming image data 45 in such a manner that an optimized image is formed for an observer. This processed image data 47 subsequently reaches a visualization unit 48, for example, a monitor, via which it can be presented to an observer.

The sensor of a sensor element of the X-ray image detector 44 may be constructed, for example, so as to be a directly converting type in conformity with FIG. 7, or the sensor is realized as a photodiode 8 in conformity with FIG. 6, which photodiode is coupled to a scintillator which converts incident X-rays into light.

The described embodiments of the invention, that is, as far as the switching unit of the sensor elements is concerned, can be implemented by using means which are known at present. Arrangements with X-ray-sensitive or light-sensitive sensor elements are manufactured, for example, by means of the so-called thin-film technology. The switching unit, consisting of two switches (31*a*, 31*b*), can then be realized, for example, by means of two series connected TFTs or by means of a double-gate TFT.

Conventional two-dimensional arrangements and read-out concepts are based to a high degree on the arrangement of the sensor elements in a matrix of rows and columns. The embodiment of the sensor elements in accordance with the invention, however, offers the possibility of conceiving the activation of the sensor elements to be independent of the arrangement, that is, by the association of arbitrary activation patterns. For example, when in FIG. 4 the sensor elements 1*e* of a row are not assigned an identical but different activation patterns, other groups of simultaneously activatable sensor elements can be formed while preserving the topology of the control leads. When a plurality of activation patterns is associated with a sensor element 1*e* the composition of the groups of simultaneously activatable sensor elements can be changed during operation.

The described implementation can also be applied to arrangements with light-emitting elements. For example, when the photodiode 8 in FIG. 6 is replaced by a light-emitting diode and the output 3 is used as an input, an arrangement in accordance with the invention can be manufactured (while utilizing the above technologies such as the thin-film technology) so as to be suitable for use in an image-forming system, for example, a monitor.

Furthermore, such an implementation can also be applied to arrangements with light-changing elements. For example, the light-changing units then constitute the basic graphic elements of an LCD (liquid crystal display) such as the rectangular pixels in a matrix display or the individual segments in a numerical display.

The invention is of course not limited to the described or shown embodiments, but generally extends to any embodiment, which falls within the scope of the appended claims as seen in light of the foregoing description and drawings. While a particular feature of the invention may have been described above with respect to only one of the illustrated embodiments, such features may be combined with one or more other features of other embodiments, as may be desired and advantageous for any given particular application. From the above description of the invention, those skilled in the art will perceive improvements, changes and modification. Such improvements, changes and modification within the skill of the art are intended to be covered by the appended claims.

Having described a preferred embodiment of the invention, the following is claimed:

1. A sensor apparatus comprising:
   a plurality of sensor elements, each sensor element including at least one sensor and at least one output and can be activated in such a manner that in the activated state the at least one sensor is coupled to at least one output and a signal generated by the sensor is present on the output, each of the plurality of sensor elements having at least one control input and at least two of the plurality of sensor elements having two or more control inputs, the control inputs arranged to receive control signals whose combination forms signal patterns on the control inputs, each of the sensor elements including at least one switching unit coupled to the at least one sensor, to the output and to the control inputs and is arranged so as to evaluate the signal patterns present on the control inputs in order to compare these patterns with at least one activation pattern and to activate the relevant sensor element in the case of correspondence between the signal pattern present and an activation pattern, and wherein at least two sensor elements have at least one identical activation pattern.

2. The sensor apparatus of claim 1 wherein the control inputs are coupled to at least one control lead bus, the total number of leads of the control lead bus being at least equal to the number of control inputs of the plurality of sensor element having the largest number of control inputs.

3. The sensor apparatus of claim 1 wherein the sensor elements have the same number of control inputs.

4. The sensor apparatus of claim 1 wherein an activation pattern of the switching unit of at least one sensor element is formed in that the signals present on the control inputs are subjected to a logic AND operation.

5. The sensor apparatus of claim 4 wherein the switching unit comprises a row of series connected electric switches, one end of the row being coupled to the output of the sensor element whereas the other end of the row is coupled to the sensor and the switching inputs of the switches form the control inputs of the sensor element.

6. The sensor apparatus of claim 1 wherein the sensor elements are arranged in a matrix of rows and columns.

7. The sensor apparatus of claim 1 wherein the sensor elements have at least one identical activation pattern.

8. An X-ray examination system comprising an X-ray source, an X-ray image detector, the X-ray image detector comprising a plurality of sensor elements, each sensor element including at least one sensor and at least one output and can be activated in such a manner that in the activated state the at least one sensor is coupled to at least one output and a signal generated by the sensor is present on the output, each of the plurality of sensor elements having at least one control input and at least two of the plurality of sensor elements having two or more control inputs, the control inputs arranged to receive control signals whose combination forms signal patterns on the control inputs, each of the sensor elements including at least one switching unit coupled to the at least one sensor, to the output and to the control inputs and is arranged so as to evaluate the signal patterns present on the control inputs in order to compare these patterns with at least one activation pattern and to activate the relevant sensor element in the case of correspondence between the signal pattern present and an activation pattern, and wherein at least two sensor elements have at least one identical activation pattern.

9. An optical image acquisition system which includes at least one image detector, the image detector comprising a plurality of sensor elements, each sensor element including at least one sensor and at least one output and can be activated in such a manner that in the activated state the at least one sensor is coupled to at least one output and a signal generated by the sensor is present on the output, each of the plurality of sensor elements having at least one control input and at least two of the plurality of sensor elements having two or more control inputs, the control inputs arranged to receive control signals whose combination forms signal patterns on the control inputs, each of the sensor elements including at least one switching unit coupled to the at least one sensor, to the output and to the control inputs and is arranged so as to evaluate the signal patterns present on the control inputs in order to compare these patterns with at least one activation pattern and to activate the relevant sensor element in the case of correspondence between the signal pattern present and an activation pattern, and wherein at least two sensor elements have at least one identical activation pattern.

10. An apparatus comprising;
   a plurality of light-emitting elements, each of the elements including at least one input and a light-emitting unit, the light-emitting elements being activatable in such a manner that in the activated state the light-emitting unit is coupled to at least one input and the light-emitting unit emits light in dependence on the signal present on the input, the light-emitting elements having at least one control input and at least two light-emitting elements have two or more control inputs, the control inputs being arranged to receive control signals whose combination forms signal patterns on the control inputs, the light-emitting elements comprising at least one switching unit which is coupled to the light-emitting unit, to the input, and to the control inputs and is arranged to evaluate the signal patterns present on the control inputs, to compare these signal patterns with at least one activation pattern and to activate the relevant light-emitting element in the case of correspondence between the signal pattern present and an activation pattern, and wherein at least two light-emitting elements have at least one identical activation pattern.

11. The apparatus of claim 10 wherein the light emitting element changes the light in dependence on the signal present on the input.

12. An optical image display system comprising at least one image display component, the image display component comprising a plurality of light-emitting elements, each of the elements including at least one input and a light-emitting unit, the light-emitting elements being activatable in such a manner that in the activated state the light-emitting unit is coupled to at least one input and the light-emitting unit emits light in dependence on the signal present on the input, the light-emitting elements having at least one control input and at least two light-emitting elements have two or more control inputs, the control inputs being arranged to receive control signals whose combination forms signal patterns on the control inputs, the light-emitting elements comprising at least one switching unit which is coupled to the light-emitting unit, to the input, and to the control inputs and is arranged to evaluate the signal patterns present on the control inputs, to compare these signal patterns with at least one activation pattern and to activate the relevant light-emitting element in the case of correspondence between the signal pattern present and an activation pattern, and wherein at least two light-emitting elements have at least one identical activation pattern.

13. An arrangement comprising sensor elements,
   in which each sensor element includes at least one sensor and at least one output and can be activated in such a manner that in the activated state a sensor is coupled to at least one output and a signal generated by the sensor is present on the output,
   in which all sensor elements have at least one control input and at least two sensor elements have two or more control inputs and the control inputs are arranged to receive control signals whose combination forms signal patterns on the control inputs,
   in which each of the sensor elements includes at least one switching unit which is coupled to the sensor, to the output and to the control inputs and is arranged so as to evaluate the signal patterns present on the control inputs in order to compare these patterns with at least one activation pattern and to activate the relevant sensor element in the case of correspondence between the signal pattern present and an activation pattern, and
   in which at least two sensor elements have at least one identical activation pattern.

14. An arrangement as claimed in claim 13, characterized in that the control inputs are coupled to at least one control lead bus, the total number of leads of the control lead bus being at least equal to the number of control inputs of the sensor element having the largest number of control inputs.

15. An arrangement as claimed in claim 13, characterized in that all sensor elements have the same number of control inputs.

16. An arrangement as claimed in claim 13, characterized in that an activation pattern of the switching unit of at least one sensor element is formed in that the signals present on the control inputs are subjected to a logic AND operation.

17. An arrangement as claimed in claim 16, characterized in that the switching unit comprises a row of series connected electric switches, one end of the row being coupled to the output of the sensor element whereas the other end of the row is coupled to the sensor and the switching inputs of the switches form the control inputs of the sensor element.

18. An arrangement as claimed in claim 13, characterized in that the sensor elements are arranged in a matrix of rows and columns.

19. An arrangement as claimed in claim 13, characterized in that all sensor elements have at least one identical activation pattern.

20. An X-ray examination system which includes at least an X-ray source and an X-ray image detector, characterized in that the X-ray image detector is provided with at least one arrangement comprising sensor elements, in which each sensor element includes at least one sensor and at least one output and can be activated in such a manner that in the activated state a sensor is coupled to at least one output and a signal generated by the sensor is present on the output, in which all sensor elements have at least one control input and at least two sensor elements have two or more control inputs and the control inputs are arranged to receive control signals whose combination forms signal patterns on the control inputs, in which each of the sensor elements includes at least one switching unit which is coupled to the sensor, to the output and to the control inputs and is arranged so as to evaluate the signal patterns present on the control inputs in order to compare these patterns with at least one activation pattern and to activate the relevant sensor element in the case of correspondence between the signal pattern present and an activation pattern, and in which at least two sensor elements have at least one identical activation pattern.

21. An optical image acquisition system which includes at least one image detector, characterized in that the image detector is provided with at least one arrangement comprising sensor elements, in which each sensor element includes at least one sensor and at least one output and can be activated in such a manner that in the activated state a sensor is coupled to at least one output and a signal generated by the sensor is present on the output, in which all sensor elements have at least one control input and at least two sensor elements have two or more control inputs and the control inputs are arranged to receive control signals whose combination forms signal patterns on the control inputs, in which each of the sensor elements includes at least one switching unit which is coupled to the sensor, to the output and to the control inputs and is arranged so as to evaluate the signal patterns present on the control inputs in order to compare these patterns with at least one activation pattern and to activate the relevant sensor element in the case of correspondence between the signal pattern present and an activation pattern, and in which at least two sensor elements have at least one identical activation pattern.

22. An arrangement comprising light-emitting elements, in which each of the elements includes at least one light-emitting unit and at least one input, the light-emitting elements being activatable in such a manner that in the activated state the light-emitting unit is coupled to at least one input and the light-emitting unit emits light in dependence on the signal present on the input, in which all light-emitting elements have at least one control input and at least two light-emitting elements have two or more control inputs, the control inputs being arranged to receive control signals whose combination forms signal patterns on the control inputs, in which each of the light-emitting elements comprises at least one switching unit which is coupled to the light-emitting unit, to the input, and to the control inputs and is arranged to evaluate the signal patterns present on the control inputs, to compare these signal patterns with at least one activation pattern and to activate the relevant light-emitting element in the case of correspondence between the signal pattern present and an activation pattern, and in which at least two light-emitting elements have at least one identical activation pattern.

23. An optical image display system which comprises at least one image display component, characterized in that the image display component includes at least one arrangement comprising light-emitting elements, in which each of the elements includes at least one light-emitting unit and at least one input, the light-emitting elements being activatable in such a manner that in the activated state the light-emitting unit is coupled to at least one input and the light-emitting unit emits light in dependence on the signal present on the input, in which all light-emitting elements have at least one control input and at least two light-emitting elements have two or more control inputs, the control inputs being arranged to receive control signals whose combination forms signal patterns on the control inputs, in which each of the light-emitting elements comprises at least one switching unit which is coupled to the light-emitting unit, to the input, and to the control inputs and is arranged to evaluate the signal patterns present on the control inputs, to compare these signal patterns with at least one activation pattern and to activate the relevant light-emitting element in the case of correspondence between the signal pattern present and an activation pattern, and in which at least two light-emitting elements have at least one identical activation pattern.

24. The optical image display system of claim 23 wherein the light emitting element changes the light in dependence on the signal present on the input.

* * * * *